US010174867B2

(12) United States Patent
Cavallini et al.

(10) Patent No.: US 10,174,867 B2
(45) Date of Patent: Jan. 8, 2019

(54) JOINING DEVICE, SYSTEM AND METHOD FOR JOINING TWO FACING AND ALIGNED PIPELINE SECTIONS

(71) Applicant: SAIPEM S.p.A., San Donato Milanese (IT)

(72) Inventors: Francesco Cavallini, Povegliano Veronese (IT); Luca Michelazzo, Mestrino (IT); Diego Lazzarin, Treviso (IT)

(73) Assignee: SAIPEM S.p.A., San Donato Milanese (IT)

( * ) Notice: Subject to any disclaimer, the term of this patent is extended or adjusted under 35 U.S.C. 154(b) by 0 days.

(21) Appl. No.: 15/546,970

(22) PCT Filed: Feb. 9, 2016

(86) PCT No.: PCT/IB2016/050675
§ 371 (c)(1),
(2) Date: Jul. 27, 2017

(87) PCT Pub. No.: WO2016/128893
PCT Pub. Date: Aug. 18, 2016

(65) Prior Publication Data
US 2018/0017185 A1   Jan. 18, 2018

(30) Foreign Application Priority Data

Feb. 9, 2015 (IT) .............................. MI2015A0177

(51) Int. Cl.
*F16L 1/26* (2006.01)
*F16L 23/00* (2006.01)
(Continued)

(52) U.S. Cl.
CPC ................ *F16L 1/26* (2013.01); *B63G 8/001* (2013.01); *F16L 19/025* (2013.01); *F16L 23/003* (2013.01); *B63G 2008/007* (2013.01)

(58) Field of Classification Search
CPC ......................................................... F16L 1/26
(Continued)

(56) References Cited

U.S. PATENT DOCUMENTS 4,218,158 A * 8/1980 Tesson ...................... F16L 1/26
405/170
4,253,779 A * 3/1981 Grognu ..................... F16L 1/26
405/169

(Continued)

FOREIGN PATENT DOCUMENTS

EP   2 430 346   11/2013
EP   2 430 347   12/2013
(Continued)

OTHER PUBLICATIONS

Notification Concerning Submission, Obtention or Transmittal of Priority Document for International Application No. PCT/IB2016/050675 dated Mar. 2, 2016.

(Continued)

*Primary Examiner* — Frederick L Lagman
(74) *Attorney, Agent, or Firm* — Neal, Gerber & Eisenberg LLP (57) ABSTRACT

A joining device configured to join two facing and aligned pipeline sections presents two coupling members selectively couplable to respective pipeline sections at two respective facing flanges located at the ends of respective pipeline sections; a pulling mechanism suitable to move the coupling members towards each other in abutment against the flanges and to temporarily tighten the flanges by moving the coupling members towards each other; and a tightening mecha- (Continued)

nism suitable to definitively tighten the coupling members while the pulling mechanism keeps the flanges tight.

18 Claims, 7 Drawing Sheets

(51) Int. Cl.
*B63G 8/00* (2006.01)
*F16L 19/025* (2006.01)

(58) Field of Classification Search
USPC .......................................................... 405/170
See application file for complete search history.

(56) References Cited

U.S. PATENT DOCUMENTS

| | | | | |
|---|---|---|---|---|
| 4,832,530 A * | 5/1989 | Andersen | ................... | F16L 1/26 285/39 |
| 5,437,517 A | 8/1995 | Carrioli et al. | | |
| 6,234,717 B1 * | 5/2001 | Corbetta | ................. | E21B 41/04 405/158 |
| 6,439,807 B1 * | 8/2002 | Wijsman | ................... | F16L 1/26 405/170 |
| 8,449,221 B1 * | 5/2013 | Lugo | ......................... | F16L 1/26 405/169 |
| 8,974,149 B2 * | 3/2015 | Fontolan | ................. | F16L 1/166 285/302 |
| 2005/0141967 A1 * | 6/2005 | Giles | ..................... | B23P 19/069 405/158 |
| 2007/0269270 A1 * | 11/2007 | Bastesen | ................... | F16L 1/20 405/170 |
| 2009/0297274 A1 * | 12/2009 | Cafaro | ................... | E21B 43/013 405/170 |
| 2010/0047023 A1 * | 2/2010 | Horne | ....................... | F16L 1/26 405/184.1 |
| 2012/0269582 A1 * | 10/2012 | Fontolan | ................. | F16L 1/166 405/170 |

FOREIGN PATENT DOCUMENTS

| | | |
|---|---|---|
| FR | 2 928 987 | 9/2009 |
| GB | 2 038 973 | 7/1980 |
| GB | 2 324 489 | 10/1998 |
| WO | WO 03/040602 | 5/2003 |

OTHER PUBLICATIONS

International Search Report and Written Opinion for International Application No. PCT/IB2016/050675 dated May 18, 2016.
PCT Demand for International Preliminary Examination and Reply to International Search Report and the associated Written Opinion for International Application No. PCT/IB2016/050675 dated Dec. 7, 2016.
Notification of Receipt of Demand by Competent International Preliminary Examining Authority (Form PCT/IPEA/402) for International Application No. PCT/IB2016/050675 dated Dec. 13, 2016.
Second Written Opinion for International Application No. PCT/IB2016/050675 dated Jan. 17, 2017.
Reply to the Second Written Opinion for International Application No. PCT/IB2016/050675 dated Mar. 16, 2017.
Notification of Transmittal of the International Preliminary Report on Patentability (Form PCT/IPEA/416) for International Application No. International Application No. PCT/IB2016/050675 dated May 19, 2017.

* cited by examiner

JOINING DEVICE, SYSTEM AND METHOD FOR JOINING TWO FACING AND ALIGNED PIPELINE SECTIONS

PRIORITY CLAIM

This application is a national stage application of PCT/IB2016/050675, filed on Feb. 9, 2016, which claims the benefit of and priority to Italian Patent Application No. MI2015A000177, filed on Feb. 9, 2015, the entire contents of which are each incorporated by reference herein.

TECHNICAL FIELD

The present disclosure relates to a device for joining two aligned and facing pipeline sections.

BACKGROUND

In general, for the purposes of the present disclosure the definition "pipeline" means a pipeline, which, in use, lies on the bed of a body of water or is partially buried in the bed of the body of water and is intended to convey gases and/or liquids, in particular hydrocarbons. A pipeline of the type identified above can extend for hundreds of kilometers, comprises sections of pipeline joined to each other aboard a vessel, and launched into the body of water from the vessel, and is laid on the bed of the body of water by the advancement of the vessel. Generally, each section of pipeline has a length of 12 meters, a relatively large diameter of between 0.2 and 1.5 meters, and comprises a steel cylinder; a protective coating, which is made of polymeric material, is placed in contact with the steel cylinder and protects the steel cylinder from corrosion; and sometimes a weighing coat of concrete or gunite is placed in contact with the protective coating. The pipelines are usually buried in the bed near the docks and in shallow waters to protect underwater pipelines from hydrodynamic stress, from temperature fluctuations, and from possible contact with foreign bodies which could jeopardize the integrity of said pipelines, including ice in extreme weather conditions. The burying of pipelines in the bed of the body of water or their covering by appropriate-sized rocky material is a widespread practice in shallow water, but is relatively hard to execute and economically unsustainable in deep waters, where the risk profile for exposed pipes may be considered acceptable in first analysis. As a result, underwater pipelines placed on the bed of a body of water in deep water may be exposed to blunt objects such as containers falling from ships in transit or accidentally pulled behind the respective craft, literally "ploughing" the bed of the body of water and possibly damaging the pipeline by lacerating the pipeline. The frequency of these incidents is relatively low, but the damage caused is relatively very high both in terms of the environmental damage which ensues, and in terms of the fact that the energy supply of many countries is closely related to the transport of hydrocarbons through underwater pipelines of the type identified above. As a result, when these incidents happen, action must be taken relatively quickly to repair the pipeline and restore the hydraulic seal and mechanical characteristics of the same.

Methods have been proposed for such purpose which provide for carrying out all the repair phases in the body of water, and other methods which provide for performing certain repair phases above the body of water and other repair phases in the body of water. One repair method described in the U.S. Pat. No. 5,437,517 comprises steps of cutting a length of underwater pipeline containing the damaged area to define a first and a second section of underwater pipeline having respectively a first and a second end; joining a first coupling head to the first section of underwater pipeline in the body of water; joining a second coupling head to the second section of underwater pipeline in the body of water; laying a telescopic sleeve with a third and a fourth coupling head in the body of water and placing the telescopic sleeve between the first and second coupling head; aligning the first section of underwater pipeline, the second section of underwater pipeline and the telescopic sleeve in the body of water; adjusting the length of the telescopic sleeve in the body of water; joining the telescopic sleeve to the first and second coupling head in the body of water. Subsequently, the telescopic sleeve is locked into the final position. All the above operations are performed in the body of water using scuba equipment controlled by remote-controlled underwater vehicles (ROV: Remotely Operated Vehicle) connected to a vessel via a cord (umbilical).

Other methods described in documents European Patent No. 2,430,346 and European Patent No. 2,430,347 are based on the use of telescopic sleeves and permit the repair of pipelines or merely the joining of sections of pipeline laid separately. Telescopic sleeves or other types of compensation sleeves create weakened zones of the pipeline and increase the number of operations to be performed and the complexity of the join. Still other complex methods for joining pipeline sections are disclosed in PCT Patent Application No. WO 03/040602, Great Britain Patent No. 2,038, 973, and French Patent No. 2,928,987.

SUMMARY

One of the purposes of the present disclosure is to provide a joining device which is able to join two lengths of pipeline without certain of the drawbacks of certain of the prior art.

According to the present disclosure, a joining device is made for joining two facing and aligned pipeline sections, the joining device comprising two coupling members configured to be selectively coupled to respective pipeline sections in proximity of respective facing flanges located at the ends of respective pipeline sections; a pulling mechanism configured to move the coupling members towards each other so as to temporarily tighten the flanges to each other; and a tightening mechanism configured to definitively tighten the coupling members and the flanges, while the pulling mechanism maintains the flanges tight, wherein each coupling member is annular and comprises two half-rings hinged and pivotable around a hinge axis between an open position and such as to arrange the coupling members about the pipeline sections in proximity of the respective flanges, and a closed position, in which each coupling member can slide along the respective pipeline section.

Thanks to the present disclosure, the pulling mechanism is made so as to exert a relatively very great force making it possible to pull into contact the sections of pipeline making them slide on the bed, and to tighten the flanges. There is no need to provide for sleeves or other lengths of pipe suitable to compensate the distance between the flanges. The compensation is provided by the elastic behaviour of the two lengths of pipeline.

The tightening mechanism instead is activated when the pulling mechanism holds the flanges temporarily tight to complete the closure and make it definitive. As a result, the tightening mechanism is sized to withstand the static force exerted by sections of pipeline once the pulling mechanism is released, upon completion of the joining operation. In particular, the pulling mechanism comprises hydraulic actuators making it possible to provide a relatively very great tightening force, while the tightening mechanism comprises bolted joints. The bolted joints are releasable but their tightening is considered definitive in that their release involves active intervention of unscrewing them.

The pulling mechanism makes it possible to screw the bolted joints with relatively very limited torque values during the initial phase. Relatively high screwing torque values of the bolted joints are only required in the final phase of screwing to reach the desired preload tightening of the flanges in mutual contact.

A further purpose of the present is disclosure is to provide a joining method which is free of certain of the drawbacks of certain of the prior art.

According to the present disclosure a method is provided for joining two facing and aligned pipeline sections, the method comprising the steps of coupling two coupling members to respective pipeline sections in proximity of respective facing flanges located at the ends of the respective pipeline sections; temporarily tightening the flanges by a pulling mechanism configured to move the coupling members towards each other; and definitively tightening the coupling members by a tightening mechanism, while the pulling mechanism keeps the flanges tight, wherein each coupling member is annular and comprises two half-rings hinged and pivotable around a hinge axis between an open position and such as to arrange the coupling members about the pipeline sections in proximity of the respective flanges, and a closed position, in which each coupling member can slide along the respective pipeline section.

In particular, the joining device is able to exert a tightening force greater than 1,000,000 newtons.

Additional features and advantages are described in, and will be apparent from the following Detailed Description and the figures.

BRIEF DESCRIPTION OF THE DRAWINGS

Further features and advantages of the present disclosure will be evident from the description below of a non-limiting embodiment with reference to the appended drawings, wherein.

DETAILED DESCRIPTION

Figure 1:
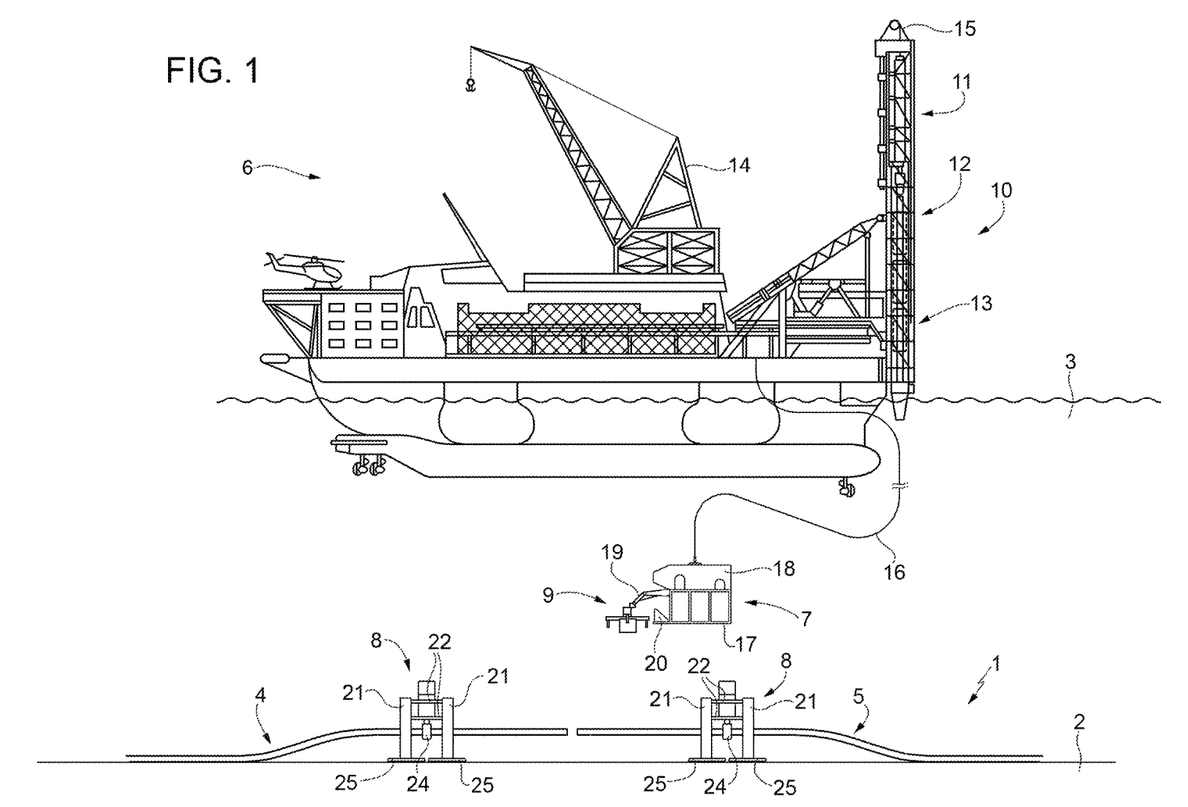
FIGS. 1 and 2 are side elevation views, with parts removed for clarity, of a joining system according to the present disclosure.
Figure 2:
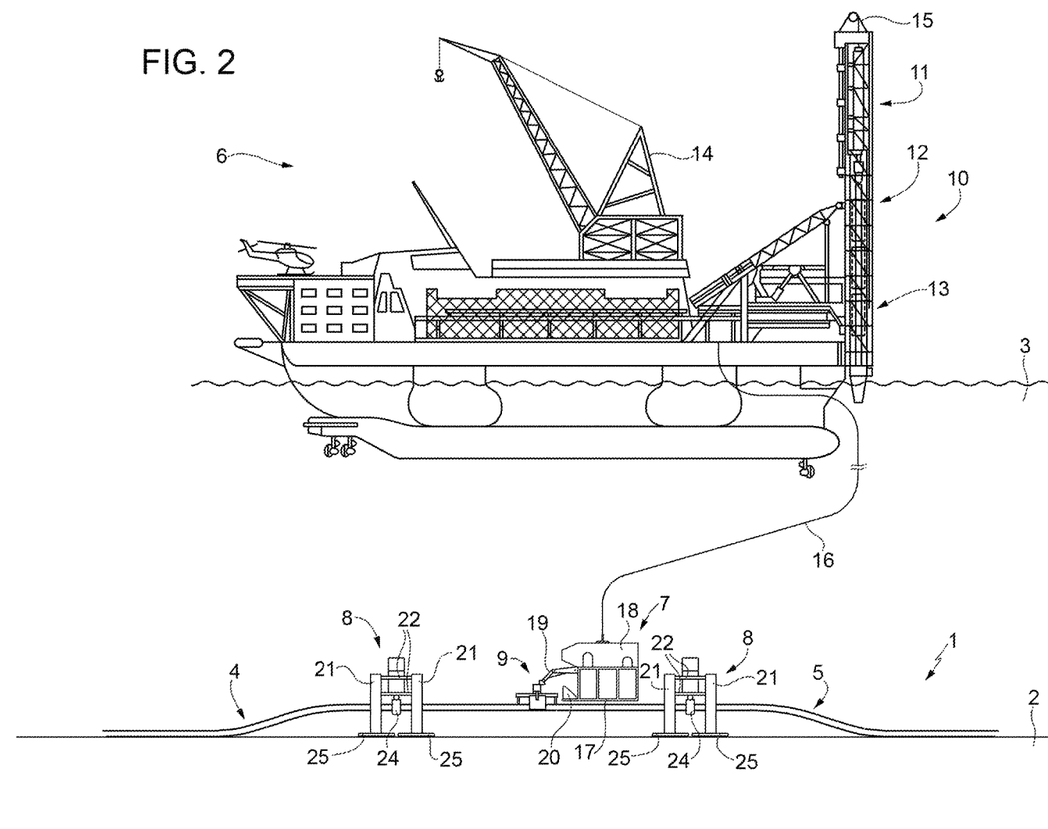

Referring now to the example embodiments of the present disclosure illustrated in FIGS. 1 to 7, with reference to FIGS. 1 and 2, reference numeral 1 globally denotes an underwater pipeline which, in use, is placed on the bed 2 of a body of water 3 to convey liquids or gases, in particular hydrocarbons. The underwater pipeline 1 comprises two separate sections 4 and 5 which must be joined. For simplicity of description and simplification of the drawings the bed 2 of the body of water 3 is flat, but it is understood that the underwater pipeline 1 may lie on tilted or variously rough beds. In FIGS. 1 and 2, in addition to the pipeline 1, a repair and/or joining system of the underwater pipeline 1 is shown in part. The system comprises a vessel 6; a remotely operated underwater vehicle 7 (Remotely Operated Vehicle: ROV); two or more gantry cranes 8 suitable to be placed on the bed 2 of the body of water 3 to lift out of the bed 2 and retain the sections of pipeline 4 and 5 in a raised position from the bed 2; and a joining device 9.

The vessel 6 is configured to assemble underwater pipelines on board the vessel 6 itself and to launch underwater pipelines into the body of water 3. The vessel 6 is also possibly used to flange the free ends of the pipeline sections 4 and 5 and to provide support to the joining operations of the pipeline sections 4 and 5. In the present case illustrated, the vessel 6 comprises a floating structure and launching equipment 11, which in this case is a launching tower that extends in a substantially vertical launching direction, is fitted in an articulated manner to the floating structure, and is configured for J-type launching to lay an underwater pipeline on the bed 2 of the body of water 3. The launching equipment 10 comprises an upper section 11, in which an assembly station is placed (not shown in the drawings); an intermediate section 12 in which a tensioning equipment is placed (not shown in the drawings), and a lower section 13 in which a recovery advancement device is placed (not shown in the drawings). The vessel 6 is equipped with at least one crane 14 to make a sea landing and recover the underwater vehicle 7, the gantry cranes 8 and other equipment used in the repair of underwater pipelines 1; and with a winch 15, which is supported by the launching equipment 10 and is suitable to possibly recover the pipeline sections 4 and 5 to lift them from the bed 2 of the body of water 3 and to arrange them partly inside the launching equipment 10 at the assembly station.

The underwater vehicle 7 is a vehicle controlled by the vessel 6 by an umbilical 16 and comprises a frame 17; a float 18; cameras (not shown in the drawings); a group of propellers (not shown in the drawings); at least one manipulator arm 19, and a multifunctional attachment plate 20 suitable to be coupled to respective multifunctional attachment plates of underwater equipment suitable to carry out the operations described below. Depending on the operations performed in the body of water 3 it is possible to use one or more underwater vehicles to speed up work on the underwater pipeline 1.

The gantry cranes 8 are placed astride the pipeline sections 4 and 5. Each gantry crane 8 comprises two portal structures 21 rigidly connected together by transverse beams 22 and a group of motorized carriages 23 connected to two jaws 24 suitable to grip the pipeline sections 4 and 5. The group of motorized carriages 23 makes it possible to move the jaws 24 along a system of Cartesian axes inside the gantry structures 21. Each gantry crane 8 comprises a multifunctional connection (not shown in the drawings) and suitable to be connected to the multifunctional attachment 20 of the underwater vehicle 7, which by such connection, controls the actuation of the group of motorized carriages 23 and the jaws 24. Each portal structure 21 is provided with support plates 25 suitable to be placed so as to grip the bed 2 and define a precise position of the gantry crane 8.

Figure 6:
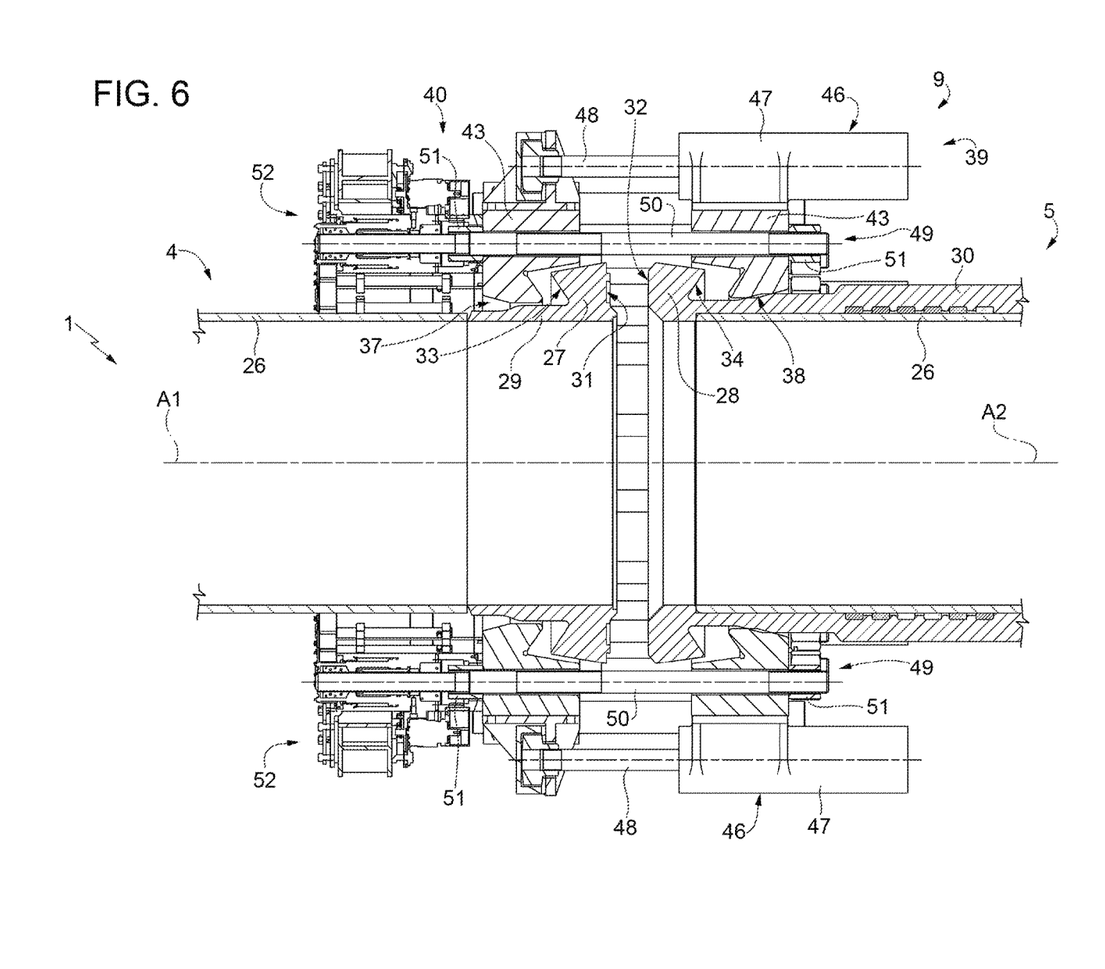
FIGS. 6 and 7 are longitudinal cross-section views, with parts removed for clarity, of two operating steps of the present disclosure.

With reference to FIG. 6, each of the pipeline sections 4 and 5 comprises a metal cylinder 26, a protective coating (not shown in the drawings) arranged around the metal cylinder 26 and made of deformable polymeric material. The term "protective coating" includes both anti-corrosive coatings, which are relatively thin (a few millimeters) made of PP (polypropylene) or PE (polyethylene), and insulation coatings, which add to the anti-corrosion characteristics those of thermal insulation. Insulating coatings reach thicknesses of tens of millimeters and are generally made of solid PU (polyurethane) or multilayer PP (polypropylene). Sometimes, there is also a further weighing coating (not shown in the drawings) in concrete or gunite placed around the protective coating (not shown in the drawings). The pipeline sections 4 and 5 have two ends aligned and facing and two respective flanges 27 and 28 of the self-centering type. The pipeline sections 4 and 5 have respective longitudinal axes A1 and A2, which are substantially aligned at the flanged ends. In the case illustrated, the flange 27 is integral with a respective sleeve 29, which is joined to the metal cylinder 26 of the pipeline section 4. The flange 28 is integral with a sleeve 30 joined to the metal cylinder 26 of the pipeline section 5. The joining methods of the sleeves 29 and 30 to the respective metal cylinders comprise: welding, and plastic deformation. The flanges 27 and 28 comprise respective faces 31 and 32 configured to be placed in contact to make a hydraulic seal and define a self-centering of the pipeline sections 4 and 5. The flanges 27 and 28 comprise respective faces 33 and 34 opposite the respective faces 31 and 32 and configured to cooperate with the joining device 9. In the present case the flanges 27 and 28 form annular recesses along the faces 33 and 34.

Figure 3:
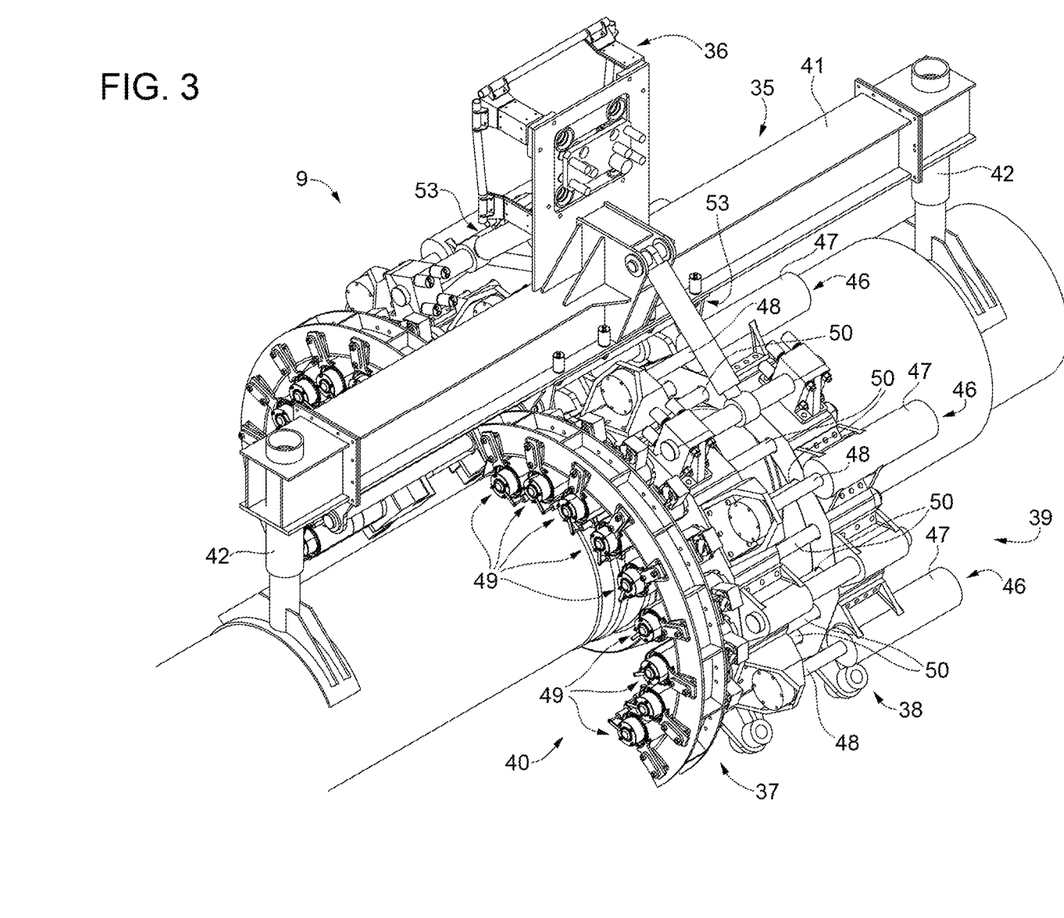
FIG. 3 is a perspective view on an enlarged scale, with parts removed for clarity, of a joining device for joining two sections of pipeline made according to the present disclosure.
Figure 4:
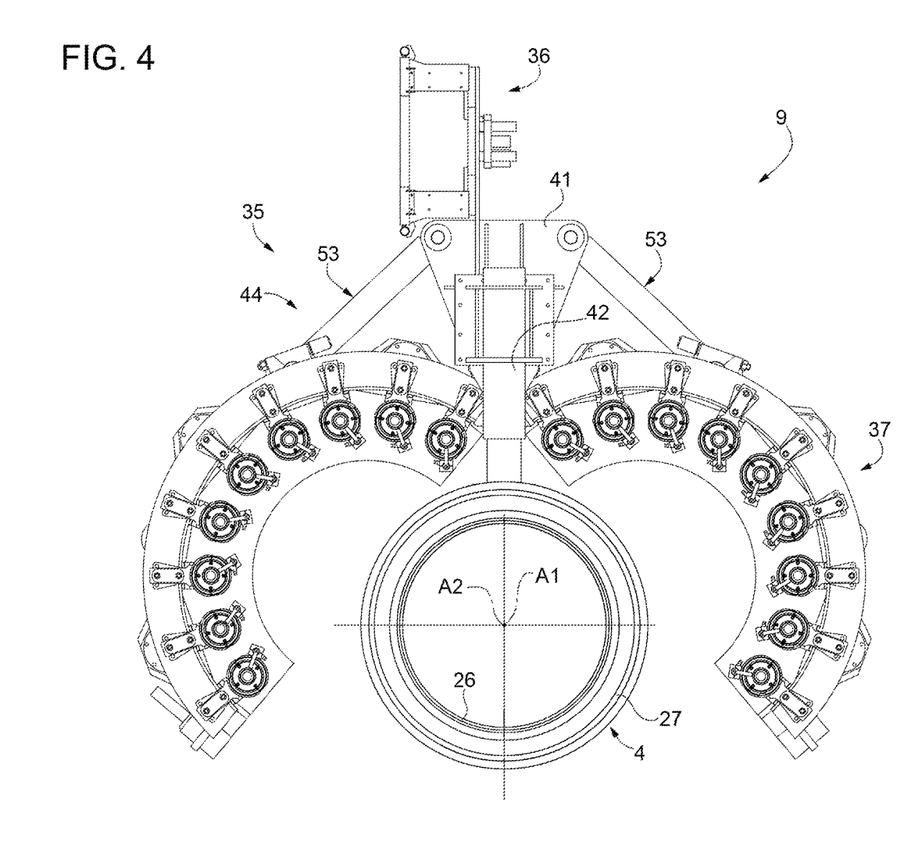
FIG. 4 is an elevation view, with parts removed for clarity and parts in cross-section, of the joining device in FIG. 3 in a coupling step with the pipeline sections.
Figure 5:
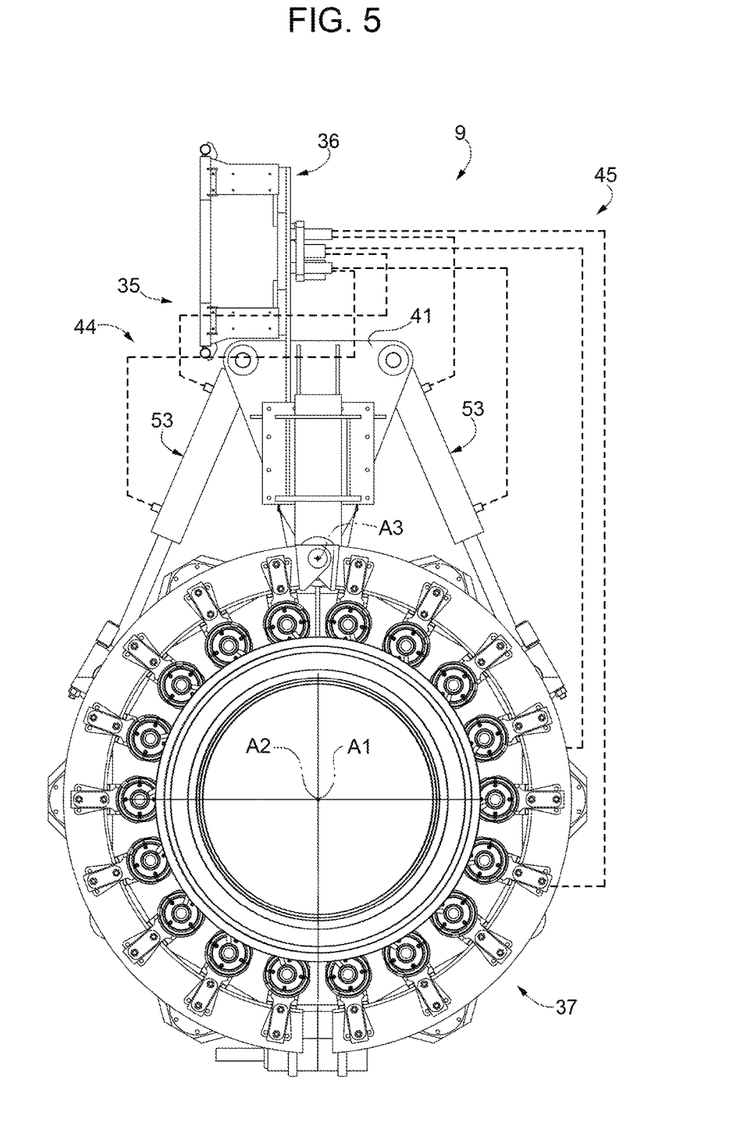
FIG. 5 is an elevation view, with parts removed for clarity and parts in cross-section, of the joining device in FIG. 3 coupled to the pipeline in a further operating step.

With reference to the FIGS. 3, 4, and 5, the joining device 9 comprises a frame 35; a multipurpose junction plate 36; two coupling members 37 and 38; a pulling mechanism 39; and a tightening mechanism 40. The pulling mechanism 39 is mounted on the coupling members 37 and 38, and is suitable to move the coupling members 37 and 38 towards one another to place them in abutment against the flanges 27 and 28 and to tighten the flanges 27 and 28. The tightening mechanism 40 is mounted on the coupling members 37 and 38, and is configured to move the coupling members 27 and 28, while the pulling mechanism 39 keeps the flanges 27 and 28 tight.

The frame 35 is configured to support the coupling members 37 and 38 and comprises a longitudinal support 41 and two spacers 42 configured to be respectively coupled to the pipeline sections 4 and 5 so as to arrange the coupling members 37 and 38 at a distance determined by the two pipeline sections 4 and 5.

Each of the coupling members 37 and 38 is a ring shape, comprises two half-rings 43 pivoted and rotatable about a common hinge axis A3 (FIG. 5) between an open position such as to enable the placing of the coupling members 37 and 38 about respective pipeline sections 4 and 5 and a closed position around the respective pipeline sections 4 and 5 at the respective flanges 27 and 28. The coupling members 37 and 38 are able to slide axially along the hinge axis A3 which, in use, is substantially parallel to the axes A1 and A2 of the pipeline sections 4 and 5. It should thus be appreciated that the coupling members 37 and 38 are configured so as to form a shaped coupling with the flanges 27 and 28, which prevents a radial disengagement of the coupling members 37 and 38 as better illustrated in FIG. 7. It should be further appreciated that the coupling members 37 and 38 engage the annular recesses of the respective flanges 27 and 28 along the faces 33 and 34.

The joining device 9 comprises a third mechanism 44 configured to selectively close the half-rings 43 around the respective pipeline sections 4 and 5.

With reference to FIG. 5, the joining device 9 also comprises a hydraulic circuit 45 to actuate the mechanisms 39, 40, 44, which, in particular, are of the hydraulic type.

With reference to FIG. 3, the pulling mechanism 39 comprises a plurality of actuators 46, which connect the coupling members 37 and 38, are selectively activated to move the coupling members 37 and 38 towards each other, tighten the flanges 27 and 28, and tension the two pipeline sections 4 and 5. In the case shown, the actuators 46 are hydraulic actuators of the linear type and uniformly distributed around the coupling elements 37 and 38.

With reference to FIG. 6, each actuator 46 comprises a cylinder 47 mounted on a coupling member 38 and a rod 48 mounted on the other coupling member 37. The tightening mechanism 40 comprises a plurality of bolted joints 49, which connect the coupling members 37 and 38 and can be selectively tightened to tighten the coupling members 37 and 38 against the flanges 27 and 28, while the pulling mechanism 39 holds the coupling members 37 and 38 tight against the flanges 27 and 28, and the flanges 27 and 28 tightened to each other. The bolted joints 49 are evenly distributed along the coupling members 37 and 38. Each bolted joint 49 comprises a bar 50, which is threaded at the ends and is engaged in respective axial holes of the coupling members 37 and 38. The threaded ends of the bar 50 protrude from opposite sides of the respective coupling members 37 and 38 and are engaged by respective nuts 51. The tightening mechanism 40 comprises a plurality of actuators 52, each of which is associated with a respective bolted joint 49 and has the function of screwing a nut 51. The actuator 52 is of the rotary type operated hydraulically and is marketed by the company Hydratight.

With reference to FIGS. 4 and 5, the coupling mechanism 44 comprises two hydraulic actuators 53 of the linear type, each of which comprises one end connected to the frame 35 and one end connected to two half-rings 43 facing each other and belonging to the two coupling members 37 and 38.

Figure 7:
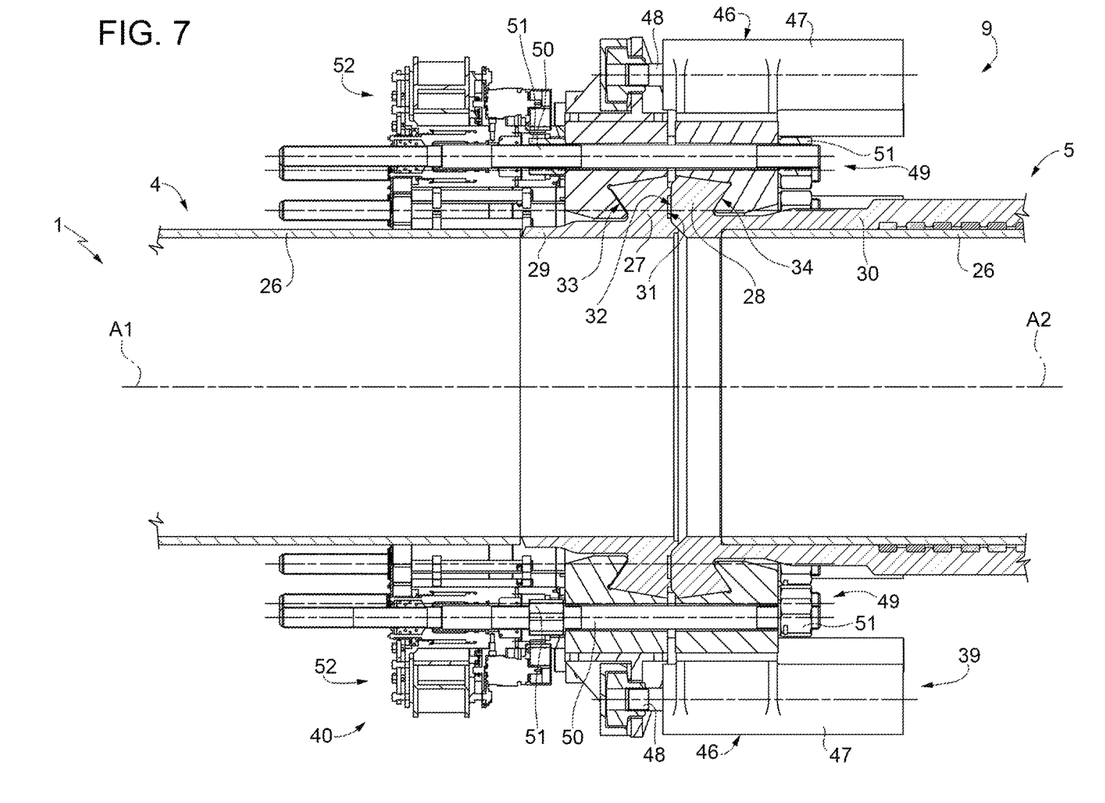

In use, once the joining device 9 has been launched in the body of water 3 and coupled to the pipeline sections 4 and 5 as shown in FIGS. 5 and 6, the coupling members 37 and 38 are moved together by the pulling mechanism 39 until the flanges 27 and 28 touch each other as shown in FIG. 7. At this stage, any small alignment errors of the axes A1 and A2 of the respective pipeline sections 4 and 5 are corrected thanks to the flanges 27 and 28 of the self-centering type. The force exerted by the pulling mechanism 39 is relatively very great and permits the elastic deformation of the pipeline sections 4 and 5 to compensate for the distance, generally a few centimeters, between the flanges 27 and 28. This tightening force is transmitted from the vessel 6 to the flanges 27 and 28 via the umbilical 16, the underwater vehicle 7, and the pulling mechanism 39, according to the diagram shown in FIG. 2. However, once the underwater vehicle 7 is uncoupled from the joining device 9, the tightening force is released. Before releasing the tightening force, the tightening mechanism 40 is actuated to tighten the flanges 27 and 28 and the coupling members 37 and 38 in the tightened position. Once the flanges 27 and 28 and the coupling members 37 and 38 have been tightened by tightening the nuts 51, the joining of the pipeline sections 4 and 5 is completed and the underwater vehicle 7 is uncoupled from the joining device 9.

It is evident that variations may be made to the embodiment described of the present disclosure while remaining within the scope of the following claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A joining device comprising:
    a first annular coupling member configured to be selectively coupled to a first pipeline section in proximity to a first flange located at an end of the first pipeline section, said first coupling member including two partial-rings hinged and pivotable around a first hinge axis from an open position to a closed position in which the first coupling member is operable to slide along the first pipeline section,
    a second annular coupling member configured to be selectively coupled to a second pipeline section in proximity to a second flange located at an of end the second pipeline section, said second coupling member including two partial-rings hinged and pivotable around a second hinge axis from an open position to a closed position in which the second coupling member is operable to slide along the second pipeline section, wherein said second flange of the second pipeline section faces and is aligned with the first flange of the first pipeline section,
    a pulling mechanism including a plurality of actuators configured to connect the first and second coupling members, wherein the plurality of actuators are selectively activated to move the first and second coupling members towards each other in abutment against the first and second flanges to temporarily tighten the first and second flanges to each other, and
    a tightening mechanism configured to definitively tighten the first and coupling members while the pulling mechanism maintains the first and second flanges tight.

2. The joining device of claim 1, wherein the actuators are hydraulic actuators each including a hydraulic cylinder mounted on one of the coupling members and a rod mounted on the other one of the coupling members.

3. The joining device of claim 1, wherein the actuators are evenly distributed along the first and second coupling members.

4. The joining device of claim 1, wherein the tightening mechanism includes a plurality of bolted joints which extend through the first and second coupling members and are selectively tightened to tighten the first and second coupling members in abutment on the tight first and second flanges.

5. The joining device of claim 4, wherein the bolted joints are evenly distributed along the first and second coupling members.

6. The joining device of claim 1, further comprising a coupling mechanism configured to selectively pivot the partial rings about the hinge axes.

7. The joining device of claim 1, further comprising a hydraulic circuit configured to actuate the pulling mechanism and the tightening mechanism.

8. A pipeline section joining system comprising:
    a joining device including:
        a first annular coupling member configured to be selectively coupled to a first pipeline section in proximity to a first flange located at an end of the first pipeline section, said first coupling member including two partial-rings hinged and pivotable around a first hinge axis from an open position to a closed position in which the first coupling member is operable to slide along the first pipeline section,
        a second annular coupling member configured to be selectively coupled to a second pipeline section in proximity to a second flange located at an of end the second pipeline section, said second coupling member including two partial-rings hinged and pivotable around a second hinge axis from an open position to a closed position in which the second coupling member is operable to slide along the second pipeline section, wherein said second flange of the second pipeline section faces and is aligned with the first flange of the first pipeline section,
        a pulling mechanism including a plurality of actuators configured to connect the first and second coupling members, wherein the plurality of actuators are selectively activated to move the first and second coupling members towards each other in abutment against the first and second flanges to temporarily tighten the first and second flanges to each other, and
        a tightening mechanism configured to definitively tighten the first and coupling members while the pulling mechanism maintains the first and second flanges tight,
    an underwater vehicle configured to be operatively connected to the joining device to control a position and an actuation of the joining device, and
    a plurality of cranes configured to maintain the free ends of the pipeline sections facing and raised from a bed of a body of water.

9. The pipeline section joining system of claim 8, further comprising a vessel connected to the underwater vehicle by an umbilical.

10. A method for joining pipeline sections, the method comprising:
    coupling two coupling members to two pipeline sections in proximity of facing flanges located at the ends of the two pipelines sections, wherein each coupling member is annular and includes two partial-rings hinged and pivotable around a hinge axis from an open position wherein the coupling members are arranged about the pipeline sections to a closed position in which each coupling members is operable to slide along one of the pipeline sections,
    temporarily tightening the flanges by a pulling mechanism including a plurality of actuators configured to connect the first and second coupling members, wherein the plurality of actuators are selectively activated to move the coupling members towards each other to temporarily tighten the flanges to each other, and
    definitively tightening the coupling members by a tightening mechanism while the pulling mechanism keeps the flanges tight.

11. The method of claim 10, wherein temporarily tightening the flanges by the pulling mechanism uses a force of at least 1,000,000 newtons.

12. The method of claim 10, which is implemented in a body of water.

13. A joining device comprising:
    a first annular coupling member configured to be selectively coupled to a first pipeline section in proximity to a first flange located at an end of the first pipeline section, said first coupling member including two partial-rings hinged and pivotable around a first hinge axis from an open position to a closed position in which the first coupling member is operable to slide along the first pipeline section, a second annular coupling member configured to be selectively coupled to a second pipeline section in proximity to a second flange located at an of end the second pipeline section, said second coupling member including two partial-rings hinged and pivotable around a second hinge axis from an open position to a closed position in which the second coupling member is operable to slide along the second pipeline section, wherein said second flange of the second pipeline section faces and is aligned with the first flange of the first pipeline section, a pulling mechanism configured to move the first and second coupling members towards each other to temporarily tighten the first and second flanges to each other, and a tightening mechanism including a plurality of bolted joints and a plurality of actuators each of which is coupled to one of the bolted joints and configured to selectively tighten the bolted joint, wherein the bolted joints extend through the first and second coupling members and are selectively tightened to tighten the first and second coupling members in abutment to definitively tighten the first and coupling members while the pulling mechanism maintains the first and second flanges tight.

14. The joining device of claim 13, wherein the bolted joints are evenly distributed along the first and second coupling members.

15. A joining device comprising:
a first annular coupling member configured to be selectively coupled to a first pipeline section in proximity to a first flange located at an end of the first pipeline section, said first coupling member including two partial-rings hinged and pivotable around a first hinge axis from an open position to a closed position in which the first coupling member is operable to slide along the first pipeline section, a second annular coupling member configured to be selectively coupled to a second pipeline section in proximity to a second flange located at an of end the second pipeline section, said second coupling member including two partial-rings hinged and pivotable around a second hinge axis from an open position to a closed position in which the second coupling member is operable to slide along the second pipeline section, wherein said second flange of the second pipeline section faces and is aligned with the first flange of the first pipeline section, a pulling mechanism configured to move the first and second coupling members towards each other to temporarily tighten the first and second flanges to each other, a tightening mechanism configured to definitively tighten the first and coupling members while the pulling mechanism maintains the first and second flanges tight, and a coupling mechanism including a plurality of hydraulic actuators and configured to selectively pivot the partial rings about the hinge axes.

16. A joining device comprising:
a first annular coupling member configured to be selectively coupled to a first pipeline section in proximity to a first flange located at an end of the first pipeline section, said first coupling member including two partial-rings hinged and pivotable around a first hinge axis from an open position to a closed position in which the first coupling member is operable to slide along the first pipeline section, a second annular coupling member configured to be selectively coupled to a second pipeline section in proximity to a second flange located at an of end the second pipeline section, said second coupling member including two partial-rings hinged and pivotable around a second hinge axis from an open position to a closed position in which the second coupling member is operable to slide along the second pipeline section, wherein said second flange of the second pipeline section faces and is aligned with the first flange of the first pipeline section, a pulling mechanism configured to move the first and second coupling members towards each other to temporarily tighten the first and second flanges to each other, a tightening mechanism configured to definitively tighten the first and coupling members while the pulling mechanism maintains the first and second flanges tight, and a frame configured to support the first and second coupling members, the pulling mechanism, and the tightening mechanism.

17. The joining device of claim 16, wherein the frame comprises first spacers configured to be coupled to the first pipeline section and second spacers configured to be coupled to the second pipeline section.

18. The joining device of claim 16, wherein the frame comprises a multipurpose junction plate for an underwater vehicle.

* * * * *